United States Patent
Chiu et al.

(10) Patent No.: US 11,112,824 B2
(45) Date of Patent: Sep. 7, 2021

(54) BACKLIGHT MODULE AND DISPLAY DEVICE

(71) Applicant: Coretronic Corporation, Hsin-Chu (TW)

(72) Inventors: Ta-Hsiang Chiu, Hsin-Chu (TW); Wei-Hsuan Cheng, Hsin-Chu (TW); Huai-Chung Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/808,401

(22) Filed: Mar. 4, 2020

(65) Prior Publication Data
US 2020/0293086 A1 Sep. 17, 2020

(30) Foreign Application Priority Data

Mar. 11, 2019 (CN) .......................... 201910180211.0

(51) Int. Cl.
*G02F 1/00* (2006.01)
*G06F 1/16* (2006.01)
(Continued)

(52) U.S. Cl.
CPC ......... *G06F 1/1609* (2013.01); *G02B 6/0078* (2013.01); *G02F 1/133512* (2013.01); *G02F 1/133606* (2013.01); *G06F 1/1626* (2013.01)

(58) Field of Classification Search
CPC ......... G02F 1/133512; G02F 1/133606; G06F 1/1609; G06F 1/1626; G02B 6/0078
See application file for complete search history.

(56) References Cited

U.S. PATENT DOCUMENTS

| 8,754,997 B2* | 6/2014 | Onishi | G02F 1/134336 |
| | | | 349/58 |
| 2003/0179979 A1* | 9/2003 | Ouchi | G02B 6/4214 |
| | | | 385/14 |

(Continued)

FOREIGN PATENT DOCUMENTS

| CN | 2736798 Y | 10/2005 |
| CN | 102495499 A | 6/2012 |

(Continued)

OTHER PUBLICATIONS

Communication pursuant to Rule 114(2) EPC, dated Jan. 15, 2021, in counterpart European Application No. 20160386.7-1210/3709076, European Patent Office, Third Party Observation for application No. EP20200160386.

*Primary Examiner* — Y M. Quach Lee

(57) ABSTRACT

A backlight module includes a light guide plate, a light source, an optical film set and at least one light shielding layer. The light guide plate has a light incident surface and a light emitting surface adjacent to the light incident surface. The light source is disposed beside the light incident surface. The optical film set includes a first surface, a second surface and at least one end surface. The first surface and the second surface are opposite to each other. The at least one end surface is connected to the first surface and the second surface. The optical film set is disposed on the light emitting surface of the light guide plate. The first surface faces the light emitting surface. The at least one light shielding layer is disposed on the at least one end surface. A display device using the backlight module is also provided.

9 Claims, 4 Drawing Sheets

(51) Int. Cl.
*F21V 8/00* (2006.01)
*G02F 1/1335* (2006.01)
*G02F 1/13357* (2006.01)

(56) References Cited

U.S. PATENT DOCUMENTS

| | | | |
|---|---|---|---|
| 2012/0063168 A1* | 3/2012 | Nambu | G02B 6/0086 362/609 |
| 2016/0085109 A1* | 3/2016 | Baek | G02F 1/133308 362/607 |
| 2016/0327718 A1 | 11/2016 | Liu et al. | |
| 2020/0117052 A1* | 4/2020 | Yim | G02F 1/133605 |

FOREIGN PATENT DOCUMENTS

| | | |
|---|---|---|
| CN | 203240403 U | 10/2013 |
| CN | 204062650 U | 12/2014 |
| JP | 2014130832 A | 7/2014 |
| KR | 20090053087 A | 5/2009 |
| KR | 10-2014-0022154 A | 2/2014 |
| TW | 200419258 A | 10/2004 |
| TW | 200804931 A | 1/2008 |
| WO | 2016078123 A1 | 5/2016 |
| WO | 2018051855 A1 | 3/2018 |
| WO | 2018221878 A1 | 12/2018 |
| WO | 2019095401 A1 | 5/2019 |

* cited by examiner

BACKLIGHT MODULE AND DISPLAY DEVICE

CROSS-REFERENCE TO RELATED APPLICATION

This application claims the priority benefit of China application serial no. 201910180211.0, filed on Mar. 11, 2019. The entirety of the above-mentioned patent application is hereby incorporated by reference herein and made a part of this specification.

FIELD OF THE INVENTION

The invention relates to a light source module and a display device, and more particularly to a backlight module and a display device having the backlight module.

BACKGROUND OF THE INVENTION

With the rapid development of display devices (such as computer screens and mobile phone screens), more attractive design are an aspect particularly valued by consumers. The appearance feature of having a narrow bezel is one of the factors that increase purchasing desire of the consumers. The narrow bezel display devices enlarge the viewable area of the display panel by reducing the left and right bezel or surrounding bezel of the display panel.

In addition, the general display device is mainly assembled of a display panel and a backlight module. The backlight module is used to provide backlight for the display panel. An optical film is often used in the backlight module, and the optical film faces the display panel, thereby providing uniform planar light to the display panel by the optical film. Most part of the light optically processed by the optical film is provided to the display panel by the side of the optical film that faces the display panel; however, a small part of the light is scattered by the end edge of the optical film. Therefore, the light scattered by the end edge of the optical film cannot be effectively shielded for the display panel having a narrow bezel structure, which results in a light halo problem generated at the border of the viewable area.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a backlight module and a display device, so as to reduce the light leakage phenomenon of the backlight module which is caused by light scattering at the end edge of the optical film set of the backlight module, thereby solving the light halo problem generated at the border of the viewable area of the display panel.

Other advantages and objects of the invention may be further illustrated by the technical features broadly embodied and described as follows.

In order to achieve one or a portion of or all of the objects or other objects, an embodiment of the invention provides a backlight module, which includes a light guide plate, a light source, an optical film set, and at least one light shielding layer. The light guide plate has a light incident surface and a light emitting surface adjacent to the light incident surface. The light source is disposed beside the light incident surface. The optical film set includes a first surface, a second surface, and at least one end surface. The first surface and the second surface are opposite to each other. The at least one end surface is connected to the first surface and the second surface. The optical film set is disposed on the light emitting surface of the light guide plate. The first surface faces the light emitting surface. The at least one light shielding layer is disposed on the at least one end surface.

In order to achieve one or a portion of or all of the objects or other objects, an embodiment of the invention provides a display device, which includes a backlight module and a display panel. The backlight module includes a light guide plate, a light source, an optical film set and at least one light shielding layer. The light guide plate has a light incident surface and a light emitting surface adjacent to the light incident surface. The light source is disposed beside the light incident surface. The optical film set includes a first surface, a second surface and at least one end surface. The first surface and the second surface are opposite to each other. The at least one end surface is connected to the first surface and the second surface. The optical film set is disposed on the light emitting surface of the light guide plate. The first surface faces the light emitting surface. The at least one light shielding layer is disposed on the at least one end surface. The display panel faces the second surface of the optical film set, wherein the optical film set is located between the display panel and the light guide plate.

The invention provides a black or gray light shielding layer at the end surface of the optical film set of the backlight module, which can reduce the light scattering phenomenon generated at the end surface of the optical film set. Therefore, even if the display panel of the display device has a narrow bezel structure, the light does not be scattered out of the end surface of the optical film set, and the light halo problem does not be generated at the border of the viewable area, thereby making the overall picture of the display panel more uniform.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
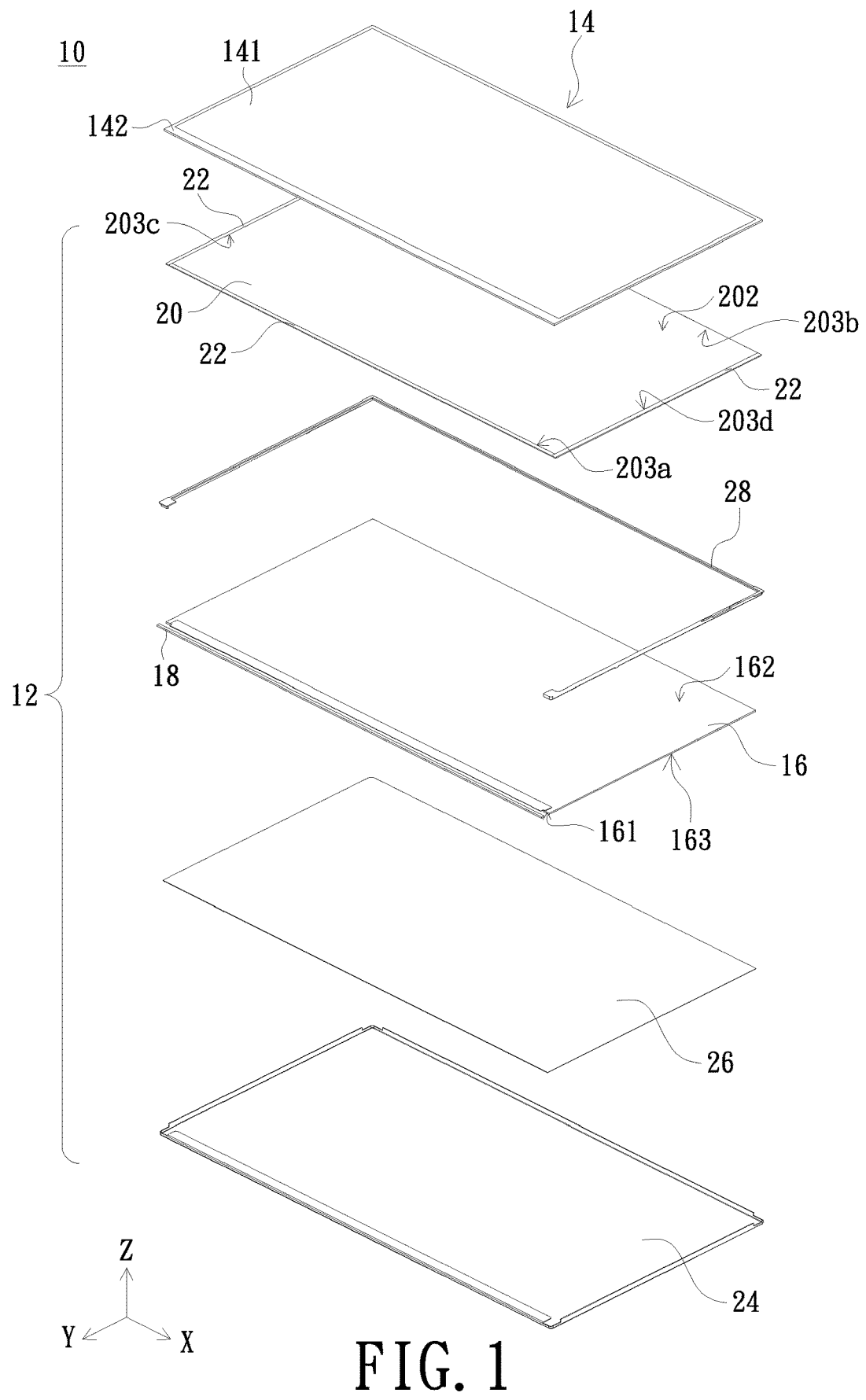
FIG. 1 is a schematic perspective exploded view of a display device according to an embodiment of the invention.
Figure 2:
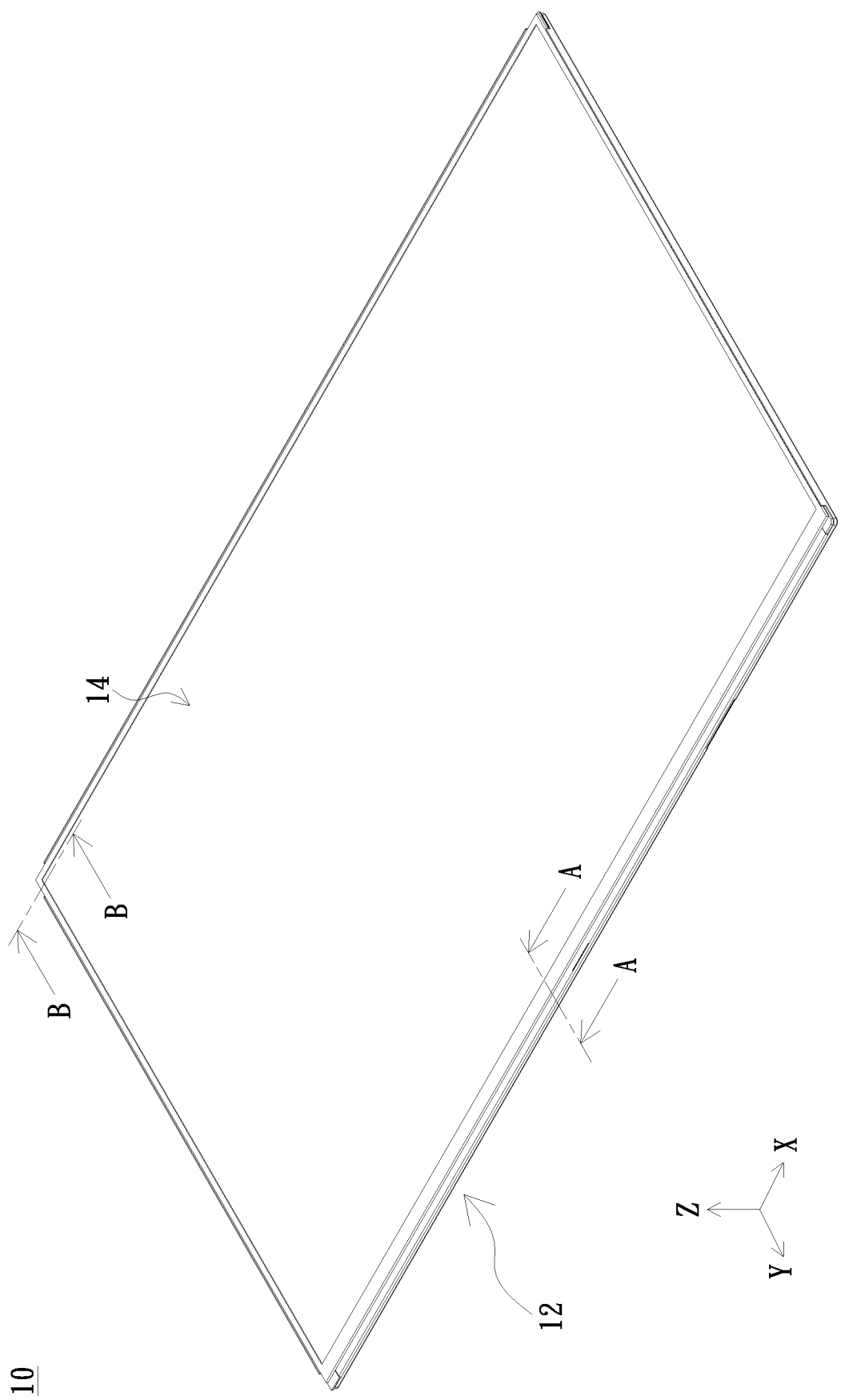
FIG. 2 is a schematic structural view of a display device according to an embodiment of the invention.
Figure 3:
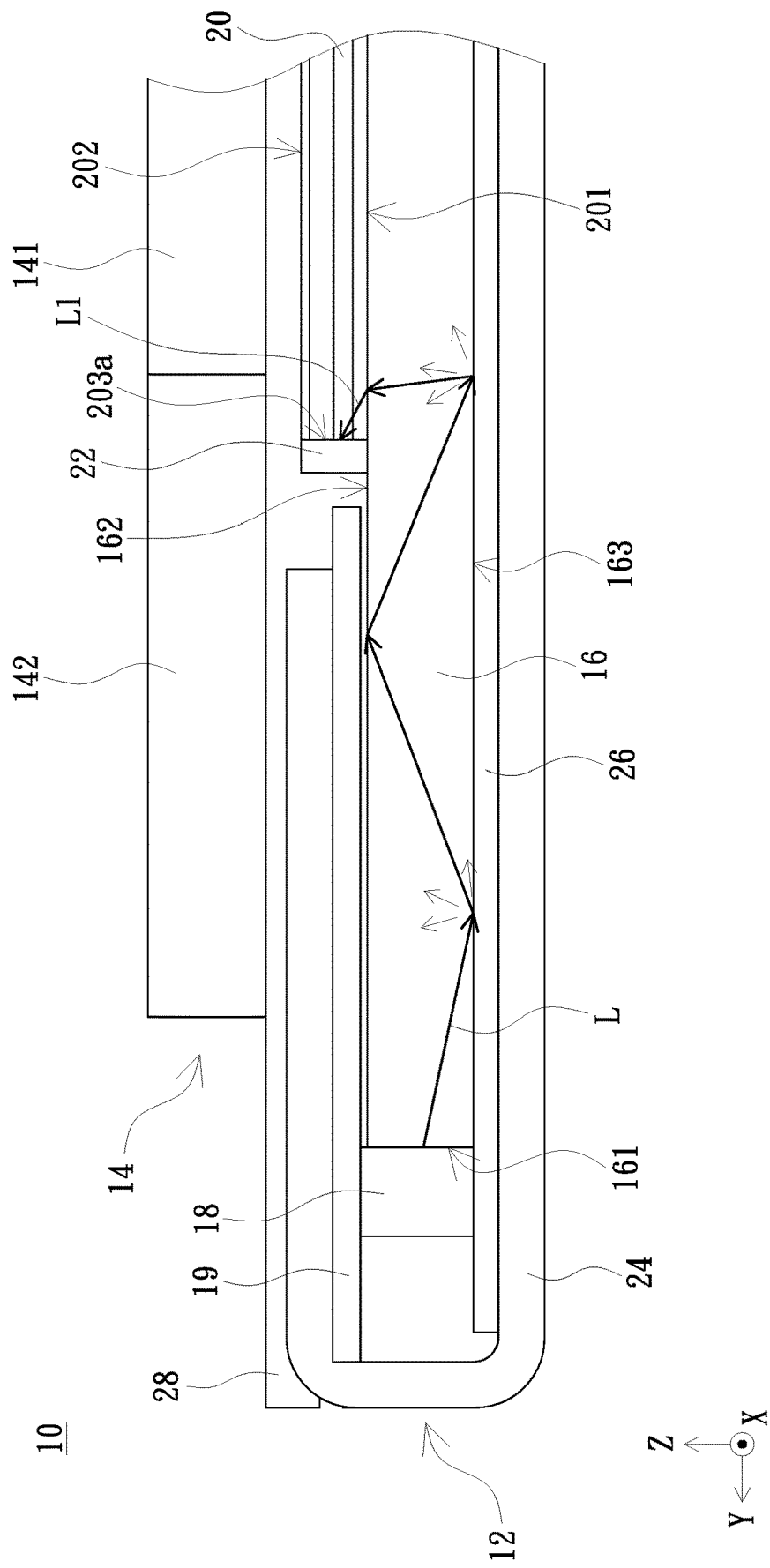
FIG. 3 is a schematic partial cross-sectional diagram of the display device taken along the line A-A in FIG. 2.
Figure 4:
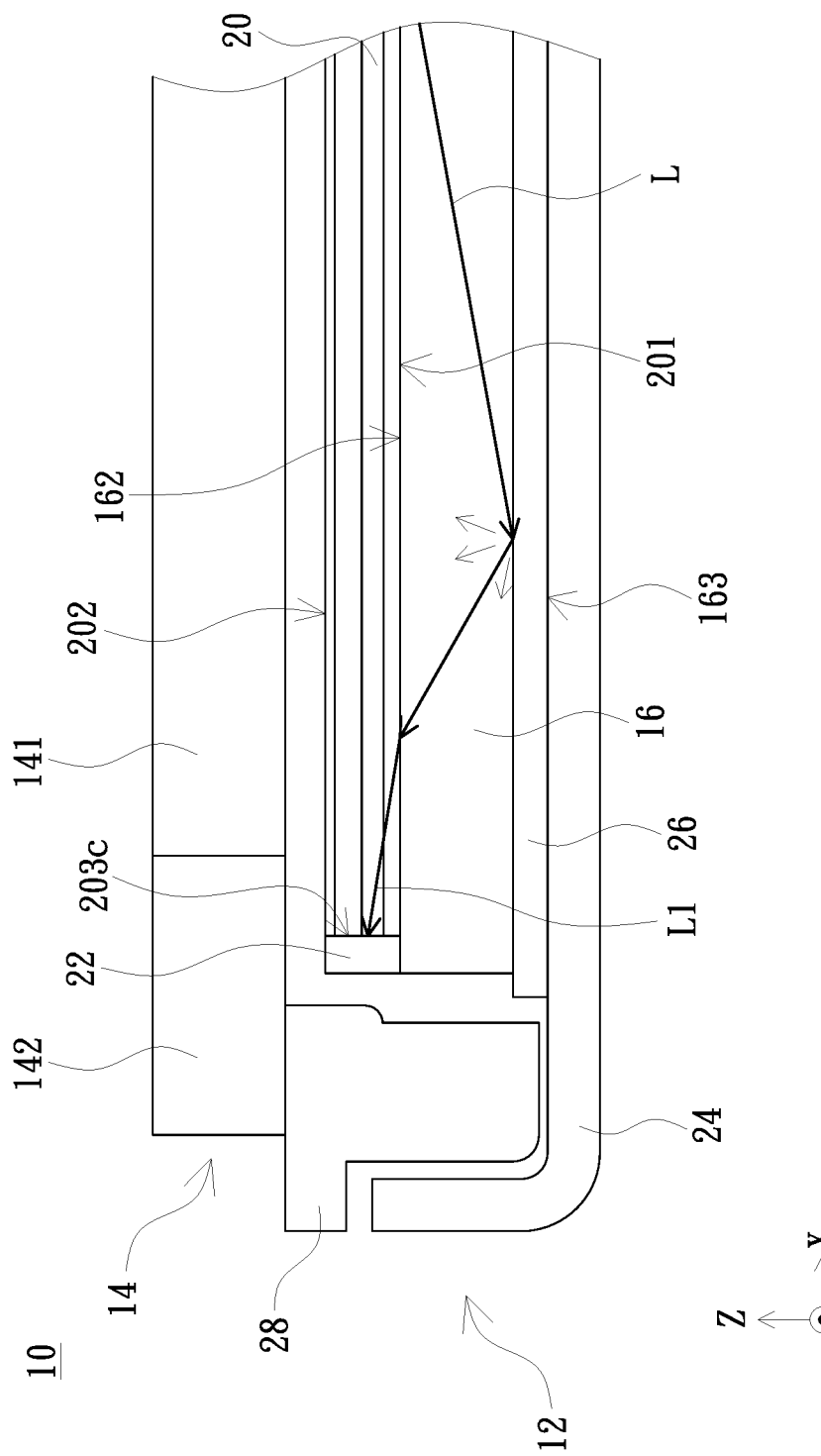
FIG. 4 is a schematic partial cross-sectional diagram of the display device taken along the line B-B in FIG. 2.

FIG. 1 is a schematic perspective exploded view of a display device according to an embodiment of the invention. FIG. 2 is a schematic structural view of a display device according to an embodiment of the invention. FIG. 3 is a schematic partial cross-sectional diagram of the display device taken along the line A-A in FIG. 2. FIG. 4 is a schematic partial cross-sectional diagram of the display device taken along the line B-B in FIG. 2. As shown in FIG. 1 to FIG. 4, a display device 10 includes a backlight module 12 and a display panel 14 disposed corresponding to the backlight module 12. The backlight module 12 is used to provide backlight for the display panel 14. In an embodiment, the display panel 14 is, for example, a liquid crystal display panel, but is not limited thereto.

The backlight module 12 includes a light guide plate 16, a light source 18, an optical film set 20 and a light shielding layer 22. As shown in FIG. 3 and FIG. 4, the light guide plate 16 has a light incident surface 161, a light emitting surface 162, and a bottom surface 163. The light emitting surface 162 is opposite to the bottom surface 163. The light incident surface 161 is connected to the bottom surface 163 and the light emitting surface 162. In an embodiment, the bottom surface 163 of the light guide plate 16 is provided with a plurality of microstructures (not shown). The light source 18 is disposed beside the light incident surface 161. The light source 18 can be a light emitting diode or other kind of light emitting element. As shown in FIG. 3, the light source 18 is used to provide a light beam L. In an embodiment, the light beam L enters the light guide plate 16 through the light incident surface 161. The light beam L is guided to the light emitting surface 162 by the microstructures of the bottom surface 163, and is emitted out of the light emitting surface 162.

Following the descriptions above, the optical film set 20 includes a first surface 201 (shown in FIG. 3 and FIG. 4), a second surface 202, and an end surface. In an embodiment, the optical film set includes four end surfaces. As shown in FIG. 1, the four end surfaces are respectively a first end surface 203a, a second end surface 203b, a third end surface 203c, and a fourth end surface 203d. As shown in FIG. 3 and FIG. 4, the first surface 201 and the second surface 202 are opposite to each other. The first end surface 203a (shown in FIG. 3), the second end surface 203b, the third end surface 203c (shown in FIG. 4), and the fourth end surface 203d are connected to the first surface 201 and the second surface 202. The first end surface 203a and the second end surface 203b are opposite to each other. The third end surface 203c and the fourth end surface 203d are opposite to each other, and are adjacent to the first end surface 203a and the second end surface 203b. The optical film set 20 is disposed on the light emitting surface 162 of the light guide plate 16, wherein the first surface 201 faces the light emitting surface 162, and the first end surface 203a faces the light source 18. The number of the light shielding layer 22 may be one or more. The light shielding layer 22 is respectively disposed on one, two, three, or all of the first end surface 203a, the second end surface 203b, the third end surface 203c, and the fourth end surface 203d. In an embodiment, the light shielding layer 22 may include an ink layer or a tape layer, and the color of the light shielding layer 22 may include black or gray.

In an embodiment, the optical film set 20 can include a plurality of optical films. The plurality of optical films are stacked in sequence. The first surface 201 of the optical film set 20 is, for example, a bottom surface of the optical film stacked at the lowermost. The second surface 202 of the optical film set 20 is, for example, a top surface of the optical film stacked at the uppermost. In addition, the optical film may be, but not limited to, a diffusion film, a brightness enhancement film (prism sheet), or the like. The optical film set 20 is, for example, a stacked combination of one or more diffusion films and one or more brightness enhancement films. In another embodiment, the optical film set 20 may be only a single optical film, and the first surface 201 and the second surface 202 are respectively the bottom surface and the top surface of the single optical film. The first end surface 203a, the second end surface 203b, the third end surface 203c, and the fourth end surface 203d are likely to be non-flat or non-smooth after the cutting process of the optical film set 20, so that the first end surface 203a, the second end surface 203b, the third end surface 203c, and the fourth end surface 203d are mostly rough surfaces. In an embodiment, as shown in FIG. 1, FIG. 3, and FIG. 4, the light shielding layer 22 is disposed on the first end surface 203a, the third end surface 203c, and the fourth end surface 203d, but is not limited thereto. The light shielding layer 22 may be disposed on one, two, three, or all of the first end surface 203a, the second end surface 203b, the third end surface 203c, and the fourth end surface 203d as needed.

Following the descriptions above, the light beam L emitted by the light source 18 is guided to the light emitting surface 162 of the light guide plate 16, and is emitted as a planar light and incident on the optical film set 20. After the optical film set 20 performs the optical processing such as homogenization or hazing on the planar light emitted from the light guide plate 16, most part of the planar light is emitted from the second surface 202 of the optical film set 20 to provide uniform planar light for the display panel 14. A small part of the light beam L1 is transmitted to the first end surface 203a, the second end surface 203b, the third end surface 203c, and/or the fourth end surface 203d of the optical film set 20, and light scattering phenomenon occurs due to the rough surface. Under this condition, the scattered light can be effectively absorbed or blocked by providing the light shielding layer 22. Therefore, the light scattering phenomenon at the first end surface 203a, the second end surface 203b, the third end surface 203c, and/or the fourth end surface 203d can be reduced.

As shown in FIG. 1 to FIG. 4, the backlight module 12 further includes a circuit board 19, a back plate 24, a reflective sheet 26, and a plastic frame 28. The circuit board 19 is, for example, a flexible printed circuit (FPC) board, and is disposed on the light emitting surface 162 of the light guide plate 16. The circuit board 19 is electrically connected to the light source 18. The light guide plate 16 is disposed on the back plate 24. The reflective sheet 26 is disposed between the back plate 24 and the bottom surface 163 of the light guide plate 16. The plastic frame 28 is assembled on the back plate 24 for receiving and fixing the light guide plate 16 and the optical film set 20. In an embodiment not shown, the plastic frame 28 can also be used to hold the display panel 14.

Please refer to FIG. 3 and FIG. 4 again. The display panel 14 is disposed corresponding to the backlight module 12. The display panel 14 faces the second surface 202 of the optical film set 20 of the backlight module 12, that is, the optical film set 20 is located between the display panel 14 and the light guide plate 16. In an embodiment, the display panel 14 includes a viewable area 141 and an ineffective area 142. The ineffective area 142 surrounds the viewable area 141. The ineffective area 142 of the display panel 14 refers to the area where the picture cannot be displayed. Taking a narrow bezel display device 10 as an example, the width of the ineffective area 142 is less than 3 mm. In an embodiment, the light shielding layer 22 is located in an orthographic projection range of the ineffective area 142 on the light guide plate 16.

In the invention, the light scattering phenomenon generated at the end surface of the optical film set can be reduced by providing the light shielding layer at the end surface of the optical film set of the backlight module. Therefore, even if the display panel of the display device has a narrow bezel structure, the light does not be scattered out of the end surface of the optical film set, and the light halo problem does not be generated at the border (i.e., the boundary between the viewable area and the ineffective area) of the viewable area, thereby making the overall picture of the display panel more uniform. In addition, the color of the light shielding layer can be black or gray. The light shielding effect can be finely adjusted for the actual brightness of the border of the viewable area by selecting the color of the light shielding layer from black, dark gray, or light gray. Therefore, it meets the optical preference for each display device user.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first surface, the second surface, the first end surface, the second end surface, the third end surface, and the fourth end surface are only used for distinguishing various elements and do not limit the number of the elements.

What is claimed is:

1. A backlight module, comprising a light guide plate, a light source, an optical film set, at least one light shielding layer, a back plate and a plastic frame, wherein
    the light guide plate has a light incident surface and a light emitting surface adjacent to the light incident surface, the light guide plate is disposed on the back plate;
    the light source is disposed beside the light incident surface;
    the optical film set comprises a first surface, a second surface and at least one end surface, the first surface and the second surface are opposite to each other, the at least one end surface is connected to the first surface and the second surface, the optical film set is disposed on the light emitting surface of the light guide plate, and the first surface faces the light emitting surface;
    the at least one light shielding layer is disposed only on the at least one end surface without extending to cover the first surface and the second surface;
    the plastic frame is assembled on the back plate for receiving and fixing the light guide plate and the optical film set; and
    the back plate and the plastic frame do not cover the at least one light shielding layer at a side of the optical film set away from the light guide plate.

2. The backlight module according to claim 1, wherein the at least one light shielding layer comprises an ink layer or a tape layer.

3. The backlight module according to claim 1, wherein a color of the at least one light shielding layer comprises black or gray.

4. The backlight module according to claim 1, wherein the light guide plate further has a bottom surface opposite to the light emitting surface, and the light incident surface is connected to the bottom surface and the light emitting surface, and the bottom surface is provided with a plurality of microstructures.

5. The backlight module according to claim 1, wherein the at least one end surface of the optical film set is a rough surface.

6. The backlight module according to claim 1, wherein a number of the at least one end surface is four, the at least one end surface are respectively a first end surface, a second end surface, a third end surface, and a fourth end surface, the first end surface and the second end surface are opposite to each other, the third end surface and the fourth end surface are opposite to each other and are adjacent to the first end surface and the second end surface, the first end surface is the end surface closest to the light source among the four end surfaces, a number of the at least one light shielding layer is plural, and the at least one light shielding layer is respectively disposed on two, three, or all of the first end surface, the second end surface, the third end surface, and the fourth end surface.

7. A display device, comprising a backlight module and a display panel, the backlight module comprises a light guide plate, a light source, an optical film set, at least one light shielding layer, a back plate and a plastic frame, wherein
the light guide plate has a light incident surface and a light emitting surface adjacent to the light incident surface, the light guide plate is disposed on the back plate;
the light source is disposed beside the light incident surface;
the optical film set comprises a first surface, a second surface and at least one end surface, the first surface and the second surface are opposite to each other, the at least one end surface is connected to the first surface and the second surface, the optical film set is disposed on the light emitting surface of the light guide plate, and the first surface faces the light emitting surface;
the at least one light shielding layer is disposed only on the at least one end surface without extending to cover the first surface and the second surface;
the display panel faces the second surface of the optical film set, wherein the optical film set is located between the display panel and the light guide plate;
the plastic frame is assembled on the back plate for receiving and fixing the light guide plate and the optical film set; and
the back plate and the plastic frame do not cover the at least one light shielding layer at a side of the optical film set away from the light guide plate.

8. The display device according to claim 7, wherein the display panel comprises a viewable area and an ineffective area, the ineffective area surrounds the viewable area, a width of the ineffective area is less than 3 mm.

9. The display device according to claim 8, wherein the at least one light shielding layer is located in an orthographic projection range of the ineffective area on the light guide plate.

* * * * *